(12) United States Patent
 Zdepski

(10) Patent No.: US 9,591,343 B2
(45) Date of Patent: *Mar. 7, 2017

(54) COMMUNICATING PRIMARY CONTENT STREAMS AND SECONDARY CONTENT STREAMS

(71) Applicant: OpenTV, Inc., San Francisco, CA (US)

(72) Inventor: Joel Zdepski, Mountain View, CA (US)

(73) Assignee: OpenTV, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/872,950

(22) Filed: Oct. 1, 2015

(65) Prior Publication Data

US 2016/0021413 A1 Jan. 21, 2016

Related U.S. Application Data

(63) Continuation of application No. 14/444,956, filed on Jul. 28, 2014, now Pat. No. 9,172,978, which is a
(Continued)

(51) Int. Cl.
*H04N 21/2668* (2011.01)
*H04N 21/234* (2011.01)
(Continued)

(52) U.S. Cl.
CPC ..... *H04N 21/2668* (2013.01); *H04N 21/2365* (2013.01); *H04N 21/23424* (2013.01);
(Continued)

(58) Field of Classification Search
CPC ......... H04N 21/2668; H04N 21/23424; H04N 21/234363; H04N 21/2365;
(Continued)

(56) References Cited

U.S. PATENT DOCUMENTS 6,405,371 B1  6/2002  Oosterhout et al.
6,738,978 B1  5/2004  Hendricks et al.
(Continued)

FOREIGN PATENT DOCUMENTS

JP        2005531971 A   10/2005
WO   WO-2004075550 A1    2/2004
(Continued)

OTHER PUBLICATIONS

"U.S. Appl. No. 10/897,042, Appeal Brief filed Aug. 18, 2009", 30 pgs.
(Continued)

*Primary Examiner* — Randy Flynn
(74) *Attorney, Agent, or Firm* — Schwegman Lundberg & Woessner, P.A.

(57) ABSTRACT

The invention relates to a method and system to communicate primary and secondary content streams to at least one remote unit, for example, via a television channel in a targeted television environment. The secondary content stream comprises a plurality of tertiary content streams (e.g., video streams) providing commercials, advertisements or any other content. The tertiary content streams are included in the secondary content stream as a mosaic so that each tertiary content stream is a subset or portion of an active display area or frame provided by the single secondary content stream. In one exemplary embodiment, the method and system provide targeted or specific commercial advertisements to demographically selected audiences.

20 Claims, 9 Drawing Sheets

Related U.S. Application Data continuation of application No. 10/987,042, filed on Nov. 12, 2004, now Pat. No. 8,826,328.

(51) Int. Cl.

| | | |
|---|---|---|
| *H04N 21/2343* | (2011.01) | |
| *H04N 21/2365* | (2011.01) | |
| *H04N 21/258* | (2011.01) | |
| *H04N 21/434* | (2011.01) | |
| *H04N 21/44* | (2011.01) | |
| *H04N 21/45* | (2011.01) | |
| *H04N 21/81* | (2011.01) | |
| *H04N 21/8545* | (2011.01) | |

(52) U.S. Cl.
CPC ............. *H04N 21/234363* (2013.01); *H04N 21/25883* (2013.01); *H04N 21/25891* (2013.01); *H04N 21/4347* (2013.01); *H04N 21/44016* (2013.01); *H04N 21/4532* (2013.01); *H04N 21/812* (2013.01); *H04N 21/8545* (2013.01)

(58) Field of Classification Search
CPC ....... H04N 21/25883; H04N 21/25891; H04N 21/4247; H04N 21/44016; H04N 21/4532; H04N 21/812; H04N 21/8545
See application file for complete search history.

(56) References Cited

U.S. PATENT DOCUMENTS

| | | |
|---|---|---|
| 6,789,105 B2 | 9/2004 | Lester et al. |
| 7,873,972 B2 | 1/2011 | Zaslavsky et al. |
| 8,826,328 B2 | 9/2014 | Zdepski |
| 9,172,978 B2 | 10/2015 | Zdepski et al. |
| 2001/0023436 A1 | 9/2001 | Srinivasan et al. |
| 2002/0042917 A1 | 4/2002 | Townsend et al. |
| 2002/0067376 A1 | 6/2002 | Martin et al. |
| 2002/0083441 A1 | 6/2002 | Flickinger et al. |
| 2002/0120498 A1 | 8/2002 | Gordon et al. |
| 2002/0144263 A1 | 10/2002 | Eldering et al. |
| 2002/0154692 A1 | 10/2002 | Martin |
| 2002/0194590 A1 | 12/2002 | Pong |
| 2003/0070167 A1 | 4/2003 | Holtz et al. |
| 2003/0110497 A1 | 6/2003 | Yassin et al. |
| 2003/0154128 A1 | 8/2003 | Liga et al. |
| 2003/0221191 A1 | 11/2003 | Khusheim |
| 2004/0025174 A1 | 2/2004 | Cerrato |
| 2004/0060061 A1 | 3/2004 | Parker |
| 2004/0098753 A1 | 5/2004 | Reynolds et al. |
| 2004/0143843 A1 | 7/2004 | Khoo et al. |
| 2004/0244035 A1 | 12/2004 | Wright et al. |
| 2004/0268384 A1 | 12/2004 | Stone |
| 2006/0107302 A1 | 5/2006 | Zdepski |
| 2007/0130581 A1 | 6/2007 | Del Sesto et al. |
| 2014/0337886 A1 | 11/2014 | Zdepski |

FOREIGN PATENT DOCUMENTS

| | | |
|---|---|---|
| WO | WO-2006055243 A2 | 5/2006 |
| WO | WO-2006055243 A3 | 5/2006 |

OTHER PUBLICATIONS

"U.S. Appl. No. 10/897,042, Examiner's Answer to Appeal Brief mailed Oct. 29, 2009", 29 pgs.
"U.S. Appl. No. 10/987,042, 312 Amendment filed Jul. 22, 2014", 8 pgs.
"U.S. Appl. No. 10/987,042, Advisory Action mailed Apr. 17, 2009", 3 pgs.
"U.S. Appl. No. 10/987,042, Decision on Pre-Appeal Brief Request mailed Jul. 9, 2009", 2 pgs.
"U.S. Appl. No. 10/987,042, Examiner Interview Summary mailed Sep. 20, 2013", 3 pgs.
"U.S. Appl. No. 10/987,042, Examiner Interview Summary mailed Nov. 6, 2008", 3 pgs.
"U.S. Appl. No. 10/987,042, Final Office Action mailed Feb. 18, 2009", 26 pgs.
"U.S. Appl. No. 10/987,042, Final Office Action mailed Jun. 20, 2013", 17 pgs.
"U.S. Appl. No. 10/987,042, Non Final Office Action mailed Nov. 7, 2013", 19 pgs.
"U.S. Appl. No. 10/987,042, Non Final Office Action mailed Dec. 10, 2012", 17 pgs.
"U.S. Appl. No. 10/987,042, Non-Final Office Action mailed Aug. 4, 2008", 21 pgs.
"U.S. Appl. No. 10/987,042, Notice of Allowance mailed May 28, 2014", 5 pgs.
"U.S. Appl. No. 10/987,042, Pre-Appeal Brief Request mailed May 18, 2009", 5 pgs.
"U.S. Appl. No. 10/987,042, PTO Response to Rule 312 Communication mailed Aug. 6, 2014", 2 pgs
"U.S. Appl. No. 10/987,042, Response filed Apr. 1, 2009 to Final Office Action mailed Feb. 18, 2009", 16 pgs.
"U.S. Appl. No. 10/987,042, Response filed Apr. 10, 2013 to Non Final Office Action mailed Dec. 10, 2012", 22 pgs.
"U.S. Appl. No. 10/987,042, Response filed Oct. 18, 2013 to Final Office Action mailed Jun. 10, 2013", 21 pgs.
"U.S. Appl. No. 10/987,042, Response filed Dec. 4, 2008 to Non Final Office Action mailed Aug. 4, 2008", 21 pgs.
"U.S. Appl. No. 10/987,042, Response mailed Jan. 23, 2014 to Non Final Office Action mailed Nov. 7, 2013", 17 pgs.
"U.S. Appl. No. 14/444,956, Examiner Interview Summary mailed May 18, 2015", 3 pgs.
"U.S. Appl. No. 14/444,956, Non Final Office Action mailed Apr. 7, 2015", 20 pgs.
"U.S. Appl. No. 14/444,956, Notice of Allowance mailed Aug. 26, 2015", 5 pgs.
"U.S. Appl. No. 14/444,956, Response filed Jul. 7, 2015 to Non Final Office Action mailed Apr. 7, 2015", 18 pgs.
"U.S. Appl. No. 14/444,956. Preliminary Amendment filed Jul. 29, 2014", 11 pgs.
"Australian Application Serial No. 2005306877, Examiner's Report mailed Apr. 28, 2008", 2 pgs.
"Australian Application Serial No. 2005306877, Notice of Allowance mailed Nov. 4, 2009", 3 pgs.
"Australian Application Serial No. 2005306877, Office Action mailed Apr. 28, 2008", 2 pgs.
"Australian Application Serial No. 2005306877, Response filed Mar. 31, 2009 to Examiner's Report mailed Apr. 28, 2008", 31 pgs.
"Australian Application Serial No. 2005306877, Response filed Oct. 9, 2009 to Examiner's Report mailed Apr. 16, 2009", 20 pgs.
"Australian Application Serial No. 2005306877, Second Examiner's Report mailed Apr. 16, 2009", 3 pgs.
"Australian Application Serial No. 2005306877, Second Examiner's Report mailed May 13, 2009", 15 pgs.
"European Application Serial No. 05815372.7, Extended European Search Report Mar. 14, 2011", 9 pgs.
"European Application Serial No. 05815372.7, Extended European Search Report mailed Feb. 15, 2011", 8 pgs.
"International Application Serial No. PCT/US05/39548, International Search Report mailed Mar. 7, 2007", 4 pgs.
"International Application Serial No. PCT/US05/39548, International Written Opinion mailed Mar. 7, 2007", 3 pgs.
"International Application Serial No. PCT/US2005/039548, International Preliminary Report on Patentability mailed May 24, 2007", 5 pgs.
"Japanese Application Serial No. 2007-541237, Final Office Action ailed May 27, 2012", w/ English Translation of claims, 4 pgs.
"Japanese Application Serial No. 2007-541237, Notice of Allowance mailed Oct. 2, 2012", with English translation, 6 pgs.
"Japanese Application Serial No. 2007-541237, Response filed Jun. 13, 2012 to Office Action mailed Mar. 27, 2012", with English translation of claims, 17 pgs.

(56) References Cited

OTHER PUBLICATIONS

"Japanese Application Serial No. 2007-541237, Office Action mailed Mar. 15, 2011", with English translation of claims, 6 Pgs.
"Japanese Application Serial No. 2007-541237, Response filed Jun. 15, 2011 to Office Action mailed Mar. 15, 2011", with English translation of claims, 22 pgs.
Baker, Harlyn H. et al., "Computation and Performance Issues in Coliseum, an Immersive Videoconferencing System", ACM Transactions on Multimedia Computing communication, [Online]. Retrieved from the Internet: <URL: http://www.hpl.hp.com/research/mmsl/publications/vision/mm2003>, (2003), 10 pgs.

COMMUNICATING PRIMARY CONTENT STREAMS AND SECONDARY CONTENT STREAMS

CROSS-REFERENCE TO RELATED APPLICATIONS

The present application is a continuation of U.S. patent application Ser. No. 14/444,956, filed Jul. 28, 2014, which is a continuation of U.S. patent application Ser. No. 10/987,042, filed Nov. 12, 2004, now U.S. Pat. No. 8,826,328, issued Sep. 2, 2014.

FIELD OF THE INVENTION

The present invention relates generally to the field of electronic communications and, in one exemplary embodiment, to a method and system to communicate primary and secondary content streams to at least one remote unit. For example, the invention may be applied in a television environment to provide targeted television.

BACKGROUND OF THE INVENTION

Television program distribution systems are available that provide different advertisements or commercial messages to different demographically targeted television audiences, e.g., cable or satellite television audiences. In such systems audience specific commercials or advertisements are spliced into a television feed. Thus, although the program content is distributed over a wide geographical area, different commercials or advertising are broadcast to different geographical areas providing targeted advertising.

Prior art systems require transmission of a common television message and a plurality of different multi-channel television messages over a plurality of contemporaneous channels. Predefined viewer characteristics, such as demographic characteristics, are used as the basis for selecting one of the commercial message sub-channels each time a commercial break occurs in the main television program carried on the particular television channel. In these prior art systems targeted commercials or advertisements are provided as discrete video streams in different channels or sub-channels and additional bandwidth is required for additional advertisements.

SUMMARY OF THE INVENTION

The invention relates to a method and system to communicate primary and secondary content streams to at least one remote unit, for example, via a television channel or sub-channel in a targeted television environment. The secondary content stream includes a plurality of tertiary content streams e.g., video streams) providing commercials, advertisements or any other content. The tertiary content streams are included in the secondary content stream as a mosaic so that each tertiary content stream is a subset or portion of an active display area or frame provided by the single secondary content stream. In one exemplary embodiment, the method and system provide targeted or specific commercial advertisements to demographically selected audiences.

BRIEF DESCRIPTION OF THE DRAWINGS

The present invention is illustrated by way of example, and not limitation, in the figures of the accompanying drawings. In the drawings like references indicate the same or similar elements and in which.

DETAILED DESCRIPTION

A method and a system to communicate primary and secondary content streams to at least one remote unit, for example, via a television channel or sub-channel in a targeted television environment is provided. In the following description, for purposes of explanation, numerous specific details are set forth in order to provide a thorough understanding of the present invention. It will be evident, however, to one skilled in the art that the present invention may be practiced without these specific details.

An exemplary application of the invention in a satellite interactive television environment is described below. It will also however be appreciated that the invention may apply in both digital and analog environments. In one exemplary embodiment, a content provider such as NBC, ESPN, Discovery Channel etc. may provide a primary content stream (e.g., a primary video stream with or without advertisements) to a widespread geographic region but an affiliate may wish to tailor commercials or advertisements broadcast in a specific localized geographic area. In these circumstances, an affiliate receiving the transmission may include (e.g., splice) specific targeted advertisements (e.g., prime time advertisements) into the broadcast at selected intervals. Multiple targeted advertisements (tertiary video streams) may then be included in a single secondary video stream that is broadcast to a remote unit (e.g., a set-top box). At the remote unit a particular tertiary video stream or advertisement may then be automatically selected and extracted for display at the remote unit. The selection or identification of the particular tertiary stream or advertisement may be based user profile information/data and the selection may then take place in an automated fashion without any intervention or input by a subscriber. Thus, in one embodiment, targeted or specific commercial advertisements are communicated to demographically selected audiences, a particular household, or the like that are be provided in an automated fashion. An exemplary deployment of the invention is described below with reference to an interactive television environment. However, it will be appreciated by one skilled in the art that not all the functionality provided in the exemplary interactive television environment below are required to implement the invention. The primary video stream and secondary video stream may be data streams provided by a single data channel.

Figure 1:
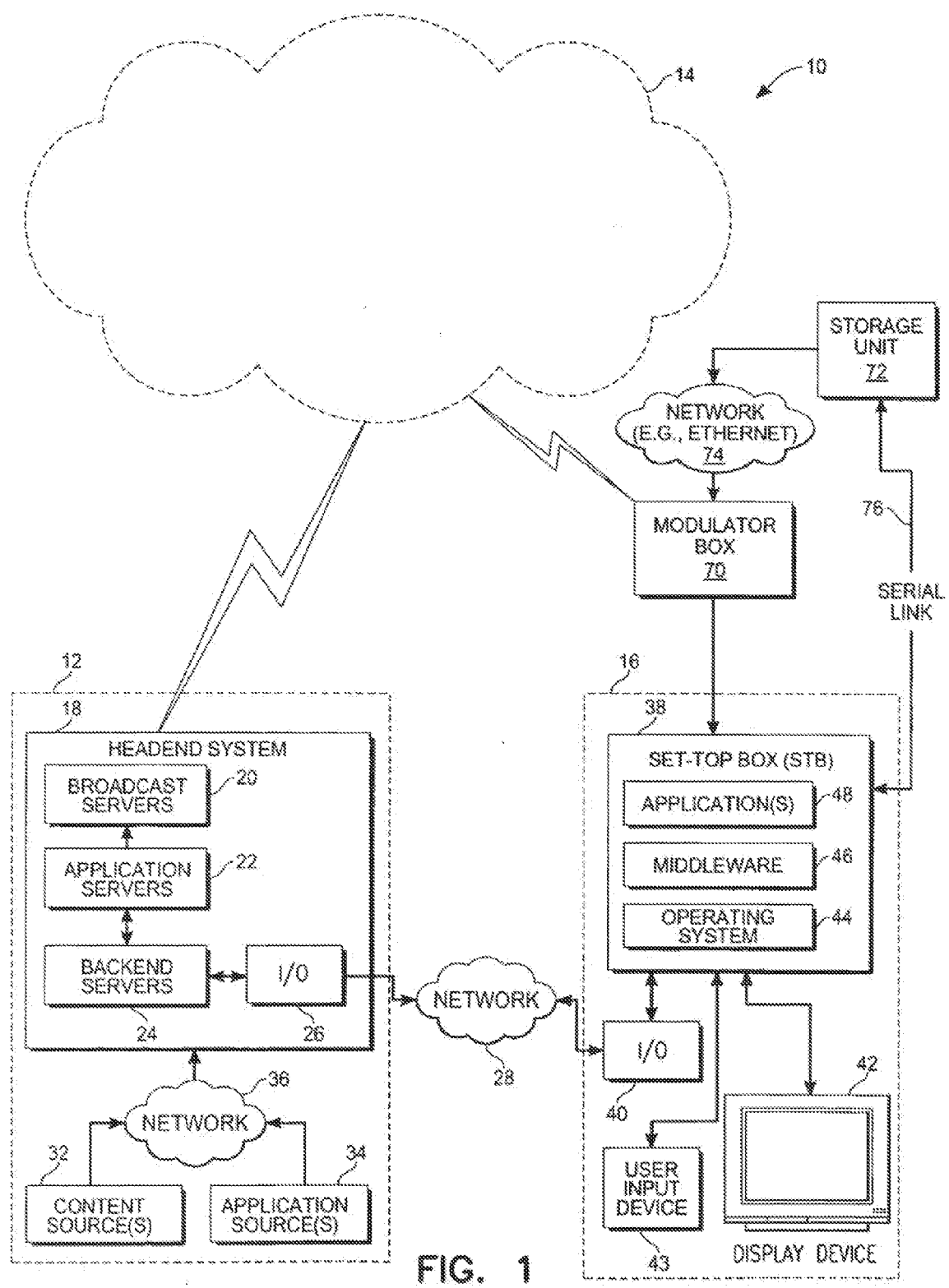
FIG. 1 is a diagrammatic representation of an exemplary interactive television environment within which the present invention may be deployed.

FIG. 1 is a diagrammatic representation of an exemplary interactive television environment 10, wherein the present invention may be deployed. The interactive television environment 10 includes a source system 12 that communicates data (e.g., television content data and interactive application data) via a distribution network or system 14 and a modulator box 70 to a receiver system 16. In other exemplary embodiments, the modulator box 72 may be replaced with (or include) a PCI board, a USB dongle or the like. In one exemplary embodiment, the interactive television environment 10 optionally includes a storage unit 72 (e.g., personal computer) that communicates stored data via a network 74 to the modulator box 70 which, in turn, communicates the stored data, television content data, and interactive application data to the receiver system 16. The modulator box 70, storage unit 72, and the receiver system 16 are typically co-located in a subscriber's home. Thus, in one embodiment, the modulator box 70 may combine television content data and interactive application data received from the remote source system 12 with local stored data provided by the storage unit 72 provided at the subscriber's home. It will be appreciated that the storage unit 72 may be any computer device running appropriate software (e.g., Linux or Microsoft Windows).

Turning first to the source system 12, an exemplary headend system 18 operates to communicate the data as a broadcast transmission. To this end, the headend system 18 is shown to include one or more broadcast servers 20 and, optionally, one or more application servers 22. Each of the broadcast servers 20 may operate to receive, encode, packetize, multiplex, modulate, and broadcast data from various sources and of various types. While the exemplary embodiment is described herein as transmitting data from the headend system 18 as a broadcast, it will be appreciated that the relevant data could also be unicast or multicast from the source system 12 via the distribution system 14 and modulator box 70 to the receiver system 16. In various embodiments, data could also be transmitted from the source system 12 via a network connection to the receiver system 16. Further details regarding an exemplary broadcast server 20 are provided below with reference to FIG. 2.

Each application server 22, in one exemplary embodiment of the present invention, serves to compile and provide interactive data modules to the broadcast server 20. The interactive data modules may also include data that is utilized by an interactive television application. An application server 22 may also include multiplexing functionality to enable multiplexing of, for example, interactive television applications and associated data with audio and video signals received from various sources. An application server 22 may also have the capability to feed (e.g., stream) multiple interactive television applications to one or more broadcast servers 20 for distribution to the receiver system 16. To this end, each application server 22 may implement a so-called "carousel", whereby code and data modules are provided to a broadcast server 20 in a cyclic, repetitive manner for inclusion within a transmission from the headend system 18. In other embodiments, code may reside permanently in the set-top box 38 (e.g., the code may be stored in non-volatile memory of the set-top box 38), may be pushed or downloaded to the set-top box 38, or be provided to the set-top box 38 in any other manner.

The headend system 18 is also shown by way of example to include one or more backend servers 24, which are coupled to the application servers 22 and to a communications I/O interface in the exemplary form of a modem pool 26. In the exemplary modem pool configuration, the modem pool 26 is coupled to receive data from the receiver systems 16 via a network 28 (e.g., the Internet and to provide this data to backend servers 24. The backend servers 24 may then provide the data, received from the receiver system 16, to the application servers 22 and the broadcast servers 20. Accordingly, the network 28 and the modem pool 26 may operate as a return channel whereby a receiver system 16 is provided with interactivity with the source system 12. Data provided to the headend system 18 via the return channel may include, merely for example, user input to an interactive television application executed at the receiver system 16 or data that is generated by the receiver system 16 and communicated to the source system 12. It will however be appreciated that any data may be communicated via the return channel (e.g., statistical data, data metering user viewing selections, etc.). The return channel 30 may also provide a channel whereby programs, targeted advertisements/commercials, and applications from the source system 12 are provided to the receiver system 16. As described in more details below, each advertisement may be provided in a tertiary content stream such as a tertiary video stream wherein a plurality of tertiary video streams are combined in a mosaic to provide a single secondary content stream such as a tertiary video stream. The secondary content stream may be inserted or spliced into the primary content or video stream at, for example, the headend system 18 using an insertion module (which may be implemented by a switch). It will however be appreciated that the mosaiced secondary video stream may be inserted into the primary data channels at any point in the exemplary interactive television environment 10.

Within the source system 12, the headend system 18 is also shown optionally to receive data (e.g., content, code and application data) from external sources. For example, FIG. 1 illustrates the headend system 18 as being coupled to one or more content sources 32 and one or more application sources 34 via a network 36 (e.g., the Internet). For example, a content source 32 could be a provider of entertainment content (e.g., movies), a provider of real-time dynamic data (e.g., weather information), a plurality of targeted advertisements, prime time viewing advertisements, or the like. An application source 34 may be a provider of any interactive television application. For example, one or more application sources 34 may provide a TV Media Player Application, Electronic Program Guide (EPG) and navigation applications, messaging and communication applications, information applications, sports applications, and/or games and gaming applications.

Turning now to the exemplary distribution system 14, the distribution system 14 may, in one embodiment, support the broadcast distribution of data from the source system 12 to the receiver system 16. As shown, the distribution network or system 14 may comprise a satellite, cable, terrestrial or Digital Subscribers Line (DSL) network, or any other data communication network or combination of such networks.

The receiver system 16 is shown, in one exemplary embodiment, to include a receiver device in the exemplary form of a set-top box (STB) 38 that receives data (primary and secondary content streams) via the distribution system 14 and modulator box 70, a communications I/O interface in the exemplary form of a modem 40 for return channel communications with the headend system 18. It will be appreciated that the communication I/O interfaces 26, 40 may be selected dependent upon the nature of the network 28. For example, the communications I/O interfaces 28, 40 may include a cable return module, a DSL return module, or the like. The receiver system 16 is also shown to include other optional external systems such as a user input device 43 (e.g., a keyboard, remote control, mouse etc.) and a display device 42, coupled to the set-top box 38, for the display of content received at the set-top box 38. In one exemplary embodiment, the display device 42 may be a television set.

The set-top box 38 may execute three layers of software, namely an operating system 44, middleware 46 and, optionally, one or more interactive television applications 48. The middleware 46 may operate to shield the interactive television application 48 from differences of various operating systems 44 and differences in hardware of different set-top boxes 38. To this end, the middleware 46 may provide driver Application Program Interfaces (APIs) and a library to translate instructions received from an interactive television or stored data application 48 into low-level commands that may be understood by set-top box hardware (e.g., modems, interface ports, smart card readers, etc.). In one exemplary embodiment, the middleware 46 includes extraction functionality to extract a selected tertiary video stream. For example, the middleware 46 may include crop and scale functionality to crop a portion or subset of an active display area provided by the secondary video stream, and scale the cropped portion or subset for display on the display device 42 an as to encompass an entire display area of the display device 42.

The modulator box 70, in one exemplary embodiment, receives stored data 98 (see FIG. 2) from the storage unit 72 and a broadcast transmission from the source system 12. The modulator box 70 multiplexes the stored data 98 into the broadcast transmission thereby generating a second transmission that is communicated to the receiving system 16. It will however be appreciated that storage unit functionality is optional. The storage unit 72 may store data and, upon request, communicate the stored data to the modulator box 70 over the network 74 (e.g., ethernet). The storage unit 72 may communicate the stored data in response to commands that are entered by a user from the set-top box 38 and communicated to the storage unit 72 over the link 76. The link 76 may be any wired or wireless link over which digital data may be communicated (e.g., an 802.11x link, a USB link, an IEEE 1394 link etc.).

Figure 2:
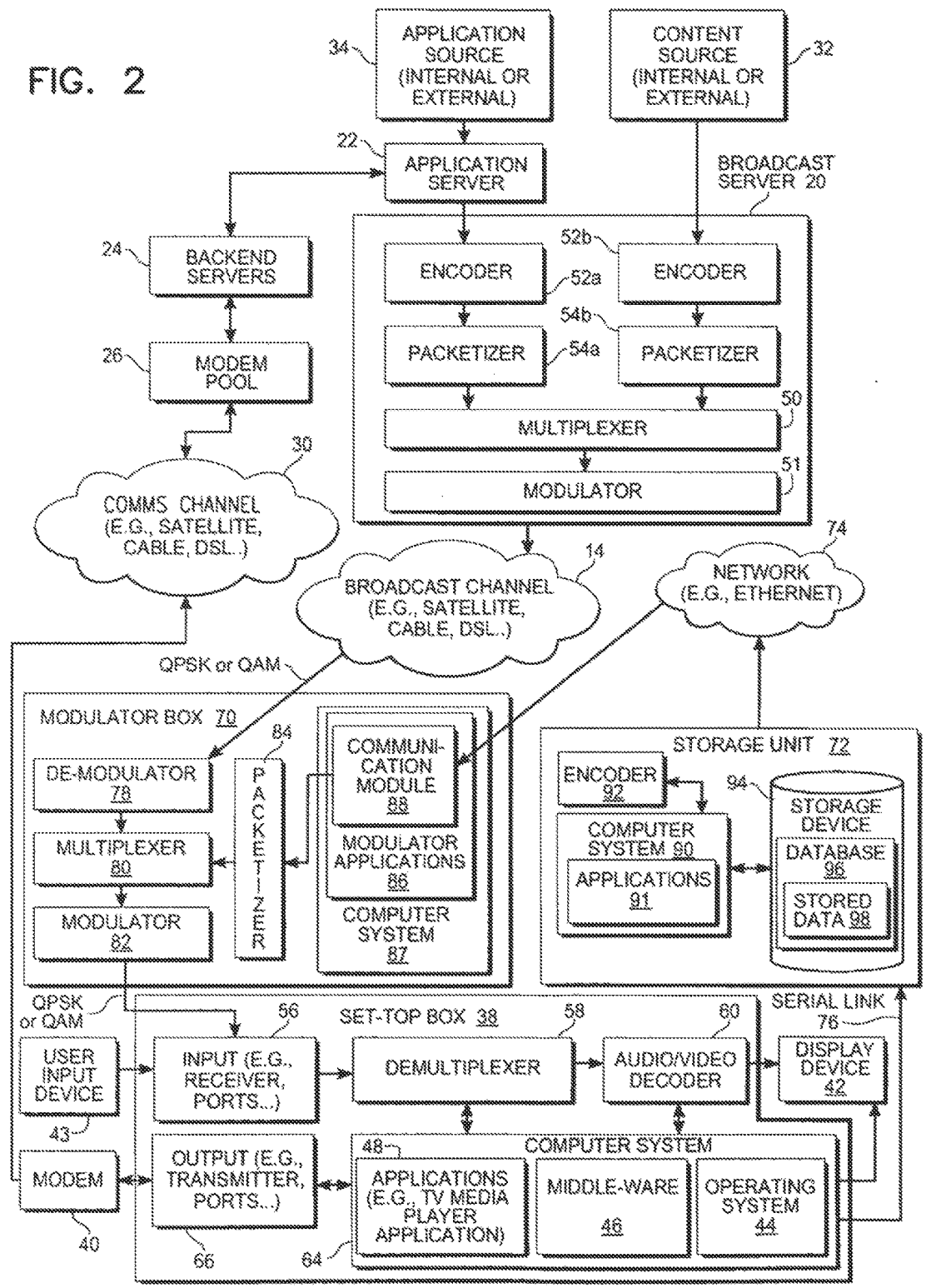
FIG. 2 is a block diagram providing architectural details regarding a broadcast server, a modulator box, a set-top box and an optional storage device according to an exemplary embodiment of the present invention.
Figure 3:
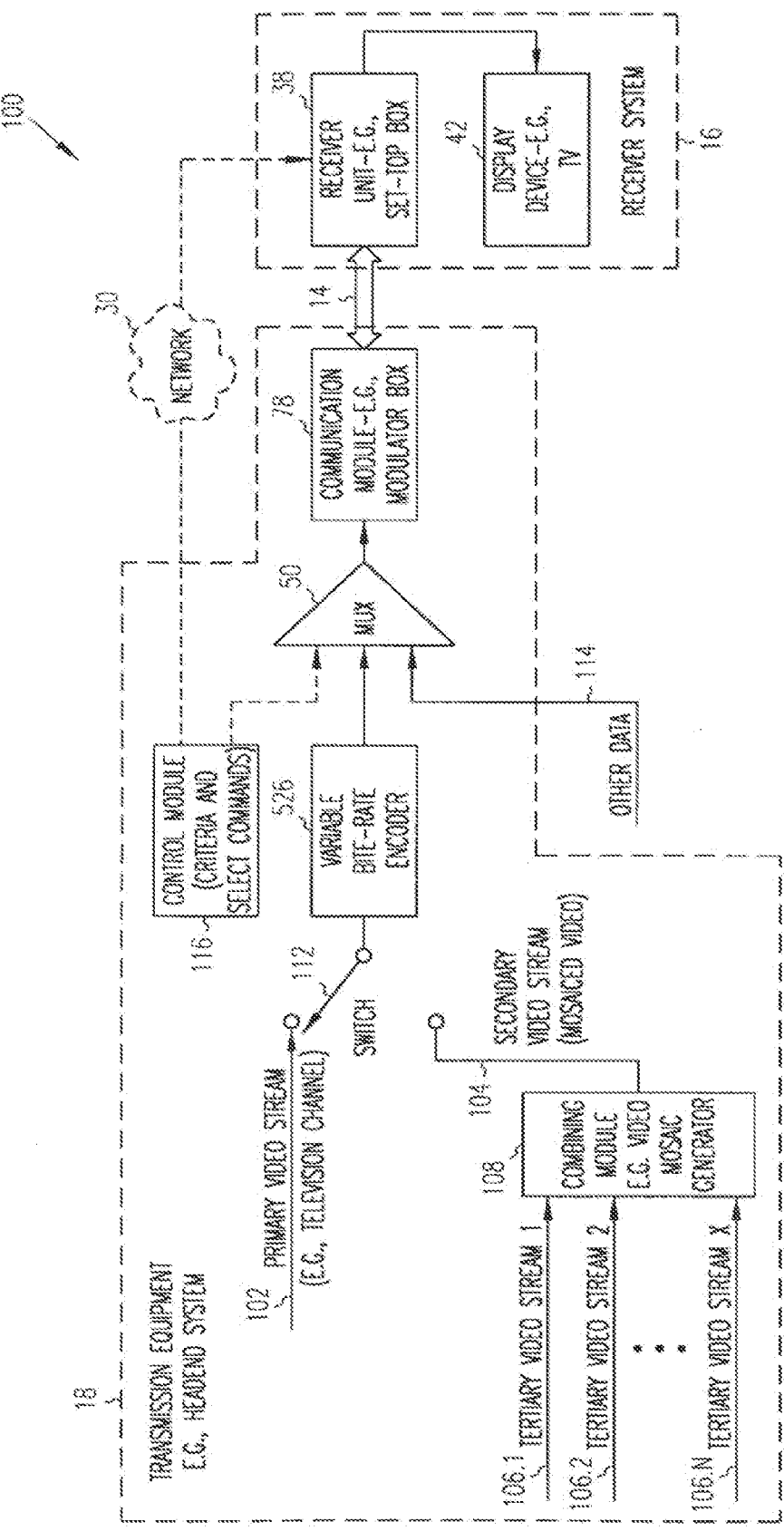
FIG. 3 is a block diagram of various exemplary components of a system showing an exemplary module to generate a secondary content video stream from a plurality of tertiary video streams, and a secondary stream processing module to extract a selected tertiary stream at a remote unit, both modules also in accordance with the invention.
Figure 5:
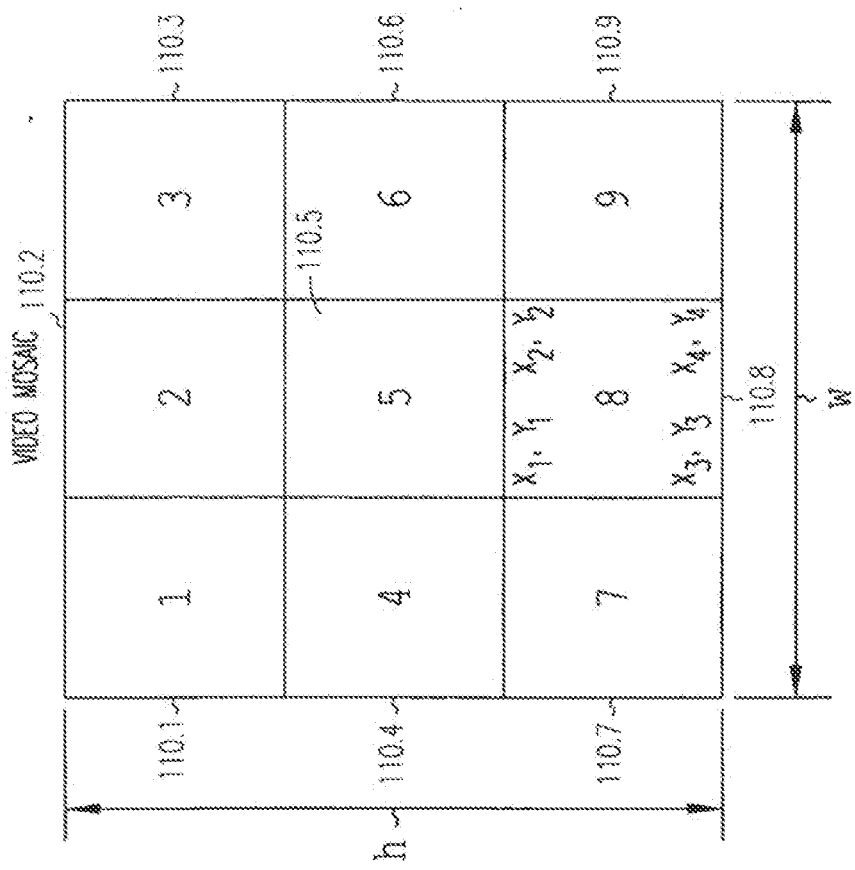
FIG. 5 shows an exemplary secondary active picture or display area provided by the secondary video stream wherein the active display area includes a mosaic of a plurality exemplary tertiary video streams.

FIG. 2 is a block diagram illustrating further exemplary details regarding the architecture of a headend system 18, a modulator box 70, a storage device or unit 94 and a set-top box 38, wherein an embodiment of the present invention may be deployed. Specifically, FIG. 2 shows a broadcast server 20, which may support a carousel of modules, as including a number of parallel paths that provide input to a multiplexer 50, each of the parallel paths including an encoder 52 and a packetizer 54. Each encoder 52 may operate to receive input from one or more sources. For example, the encoder 52a is shown to receive streamed application modules from the application server 22, which is, in turn, coupled to receive application data from one or more application sources 34. The application source 34 may be internal or external to a headend system 18. Similarly, an encoder 52b is shown coupled to receive content data from one or more content sources 32, which may again be internal or external to the headend system 18. As shown in FIG. 3, the content sources 32 may include a primary video stream (e.g., regular television programming) and a secondary video stream including multiple advertisements provided in a single picture as shown in FIG. 5.

It will be appreciated that each broadcast server 20 may include any number of parallel paths coupled to any number of sources (e.g., application and/or content sources 34 and 32) that provide input to the multiplexer 50. Furthermore, a headend system 18 may deploy any number of broadcast servers 20.

Each of the encoders 52 operates to encode data utilizing any one or more of a number of compression algorithms, such as for example the Motion Picture Expert Group (MPEG) compression algorithms. Each of the encoders 52 may also operate to time stamp data for synchronization purposes. It will be appreciated that certain data types may not be susceptible to encoding and may thus pass through, or by-pass, the encoder 52, and be provided to a packetizer 54 in an unencoded state. In one exemplary embodiment, the packetizers 54 may be coupled to receive both encoded and unencoded data and to format this data into packets before eventual transmission via the distribution system 14 (e.g., a broadcast channel).

Each of the packetizers 54 provides packets to the multiplexer 50, which multiplexes the packets into a transmission that is modulated by a modulator 51. The modulator 51 may utilize a modulation technique prior to distribution of broadcast transmission via the distribution system 14. For example, the modulator 51 may utilize a quadrature phase shift keying (QPSK) modulation technique, which is a digital frequency modulation technique that is used for communicating data over coaxial cable networking facilities or a quadrature amplitude (QAM) modulation technique, which is a digital amplitude modulation technique that is used for communicating data over wireless networking facilities.

The modulator box 70, in one exemplary embodiment, includes a demodulator 78, a multiplexer 80, a modulator 82, a packetizer 84, and a computer system 87. The demodulator 78 receives and demodulates the broadcast transmission that, in turn, is communicated to the multiplexer 80 that, in turn, is communicated to the modulator 82 that modulates, utilizing a modulation technique as described above, and communicates a transmission to the set-top box 38. The computer system 87 may execute modulator applications 86 that include a communication module 88. The communication module 88 may receive data modules from the storage unit 72, the data modules including stored data 98 in the form of application data and content data. The application data includes executable applications that may be executed by a computer system 64 on the set-top box 38. The content data includes alphanumeric, image, video and audio data that may be displayed on the display device 42 connected to the set-top box 38. The packetizer 84 packetizes the data modules into packets and communicates the packets to the multiplexer 80 that multiplexes the stream of packets that contain stored data 98 together with the multiple streams of packets in the broadcast transmission to form a plurality of streams in the exemplary form of a transmission.

The storage unit 72 (e.g., personal computer, home media center, or any other computing device) includes a computer system 90, a storage device 94, and an encoder 92. The computer system 90 may execute applications 91 (e.g., operating system, word processing, etc.) that may include a Storage Device Media Player Application that receives and processes commands that are entered by a user operating the set-top box 38. The Storage Device Media Player application may receive a command from a user that requests stored data 98 in the exemplary form of a file that resides on a database 96 on the storage device 94. Responsive to receipt of the command, the Storage Device Media Player Application may direct the storage unit 72 to communicate the requested file in the form of data module(s) to the modulator box 70 that, in turn, communicates the data module(s) to the set-top box 38. The encoder 92 operates to encode data utilizing any one or more of a number of compression algorithms, such as for example the Motion Picture Expert Group (MPEG) compression algorithms. The encoder 92 may also operate to time stamp data for synchronization purposes. It will be appreciated that certain data types may not be susceptible to encoding and may thus pass through, or by-pass, the encoder 92, and be provided to a modulator box 70 in an unencoded state.

The set-top box 38 of the exemplary receiver system 16 may be coupled to a multiplexer box 70 that is coupled to a network input (e.g., a modem), cable input, satellite dish or antenna so as to receive the broadcast transmission, transmitted from the headend system 18 via the distribution system 14. The broadcast transmission may be fed to the modulator box 70 which produces a transmission that is then fed to an input 56 (e.g., a receiver, port, etc.) on the set-top box 38. Where the input 56 comprises a receiver, the input 56 may, for example, include a tuner (not shown) that operates to select a channel on which the transmission is communicated. The packetized transmission is then fed from the input 56 to a demultiplexer 58 that demultiplexes the application and content data that constitute the transmission signal. For example, the demultiplexer 58 may provide the content data to an audio and video decoder 60, and the application data to a computer system 64. The audio and video decoder 60 decodes the content data into, for example, a television signal. For example, the audio and video decoder 60 may decode the received content data into a suitable television signal such as a NTSC, PAL or HDTV signal. The television signal is then provided from the audio and video decoder 60 to the display device 42.

The computer system 64, which may include a processor and memory, reconstructs one or more interactive television applications e.g., originating from the source system 12) and one or more stored data applications (e.g., originating from the storage unit 72) from the application data that is provided to it by the demultiplexer 58. As described in more detail below, in one embodiment the computer system 64 includes crop and scale functionality to crop a portion and scale a portion of a received advertisement stream and display the cropped and scaled portion on the display device 42. The application data may include both application code and/or application information that is used by an application 48. The computer system 64, in addition to reconstructing an application 48, executes such an application 48 to cause the set-top box 38 to perform one or more operations. For example, the computer system 64 may output a signal to the display device 42. For example, this signal from the computer system 64 may constitute an image or graphical user interface (GUI) to be overlaid on an image produced as a result of the signal provided to the display device 42 from the audio and video decoder 60. The user input device 43 (e.g., a keyboard, remote control, mouse, microphone, camera etc.) is also shown to be coupled to the input 56, so as to enable a user to provide input to the set-top box 38. Such input may, for example, be alphanumeric, audio, video, or control (e.g., manipulation of objects presented in a user interface) input.

The computer system 64 is also shown to be coupled to the audio and video decoder 60 so as to enable the computer system 64 to control this decoder 60. The computer system 64 may also receive an audio and/or video signal from the decoder 60 and combine this signal with generated signals so as to enable the computer system 64 to provide a combined signal to the display device 42.

The computer system 64 is also shown by way of example to be coupled to an output 66 (e.g., a transmitter, output port, etc.) through which the set-top box 38 is able to provide output data, via the return channel 30, to an external system, such as for example, the headend system 18. To this end, the output 66 is shown to be coupled to the modem 40 of the receiver system 16.

While the receiver system 16 is shown in FIGS. 1 and 2 to comprise a set-top box 38 coupled to a display device 42, it will readily be appreciated that the components of the receiver system 16 could be combined into a single device (e.g., a computer system), or could be distributed among a number of independent systems. For example, a separate receiver system 16 may provide input to a set-top box 38, which is then coupled to a display device 42.

Referring in particular to FIG. 3 of the drawings, an exemplary embodiment of a system 100 to communicate content, e.g. television programs and advertisements, to a remote unit is shown. The system 100 may for example, be deployed in the interactive television environment 10 shown in FIGS. 1 and 2. As described in more detail below, the system 100 combines a plurality of tertiary video or content streams such as advertisements or commercials into a mosaic in a secondary content or video stream which is transmitted or communicated to a remote receiver system including a set-top box 38. The primary and secondary video streams may be provided in a single or common broadcast channel. In one exemplary embodiment, the set-top box 38 is operable to automatically, without human intervention, identify and extract (e.g. crop and scale) a targeted advertisement for display on a display device e.g. the display device 42. The system 100 may, in a single television channel allocation, provide a main television program chosen for viewing together with a variety of alternate commercial messages to be automatically retrieved during a commercial break depending on a viewer's characteristics, such as the viewer's geographical location, personal preferences, interests, personal circumstances (e.g., parent, age group, etc.).

The system 100 includes transmission equipment e.g. a headend system 18, which receives a primary video stream 102 from a content source (e.g., the content source 32) and a secondary video stream 104, which comprises a plurality of mosaiced or combined tertiary video streams 106. In particular, the headend system 18 includes a combining module, e.g., a video mosaic generator or compositor 108, which receives the tertiary video streams and combines them into a single secondary video stream, which provides a single motion picture for communication to the set-top box 38. In one exemplary embodiment, the motion picture provided by the secondary video screen comprises a number of portions or subsets 110 (see FIG. 5) each of which correspond to a tertiary video stream that provides an advertisement for communication to the set-top box 38. In the exemplary motion picture or screen display shown in FIG. 5, the video mosaic generator 108 divides an active display or picture area of the video provided by the secondary video stream 104 into nine subsets. However, it will be appreciated that any number of subsets or portions may be created or defined. For example, in some embodiments the active display area maybe divided into four thereby creating four quadrants which correspond to four tertiary video streams each providing a commercial or advertisement.

The tertiary video streams 106 may be provided by the content source 32 (see FIG. 1) which may be located at a source such as a super headend, or at a source such as the headend system 18 as shown by way of example in FIG. 1. Likewise, the primary video stream 102 may also be sourced from a content source 32, which may be provided at the headend system 18 or at any other source of content or programming. In one exemplary embodiment, the primary video stream 102 is broadcast by a content provider such as NBC, ESPN, Discovery Channel, or the like and may include adverts or commercials within the primary video stream. The primary video stream 102 may then be received at the headend system where the advertisements or commercials in the primary video stream 102 are removed so that more appropriate or targeted advertising or commercials may be included in a transmission to the set-top box 38. In such circumstances, the secondary video stream 104 may then replace, or be inserted in place of, the advertisements in the primary video stream 102. Accordingly, the secondary video stream 104 may include advertisements that are particular or suitable for a particular audience in a geographical area serviced by the headend system 18. Further, it will be appreciated to a person of skill in the art that the transmission nay be digital or analog transmissions and may use satellite, cable or any other communication network(s). However, unlike the prior art, the secondary video stream 104 includes the advertisements or commercials in a mosaic as shown by way of example in FIG. 5.

In one exemplary embodiment, le headend system 18 includes a switch 112, which selectively switches between the primary video stream 102 and the secondary video stream 104. Accordingly, the primary video stream 102 may be broadcast or relayed to the set-top box 38 and, when an advertisement or commercial included in the primary video stream 102 is to be replaced with the plurality of advertisements provided in the secondary video stream 104, the switch 112 may then select the secondary video stream 104 which is then fed into a variable bit-rate encoder 52b. An encoded output from the variable bit-rate encoder 52b is fed into a multiplexer 50 to allow the inclusion or multiplexing of further data or signals. For example, the multiplexer 50 may include other data via an input 114, or include controls signals, such as criteria and select commands from a control module 116. The control module 116 provides controls and selects commands, which are included in the communication to the set-top box 38 that may identify the start of the secondary video stream 104. Further, in certain embodiments, the control module 116 provides parameters to the set-top box 38 which influences or assist in identifying a particular tertiary video stream (e.g. a particular advertisement or commercial) which is to be extracted from the communication received by the set-top box 38 and displayed on the display device 42 as described in more detail below. A combined output signal from the multiplexer 50 is then fed into a communication module, e.g. a modulator box 78 for transmission via a broadcast network or distribution system 14 to the set-top box 38.

In addition or instead, the control module 116 may communicate criteria and select commands via the network 30 to one or more remote units such as the set-top box 38. In one exemplary embodiment, the criteria and select commands are provided in control packets which are interpreted by the set-top box 38 and, in response thereto, a particular targeted advertisement is extracted from the secondary video stream 104 and displayed on the display device 42.

Figure 6:
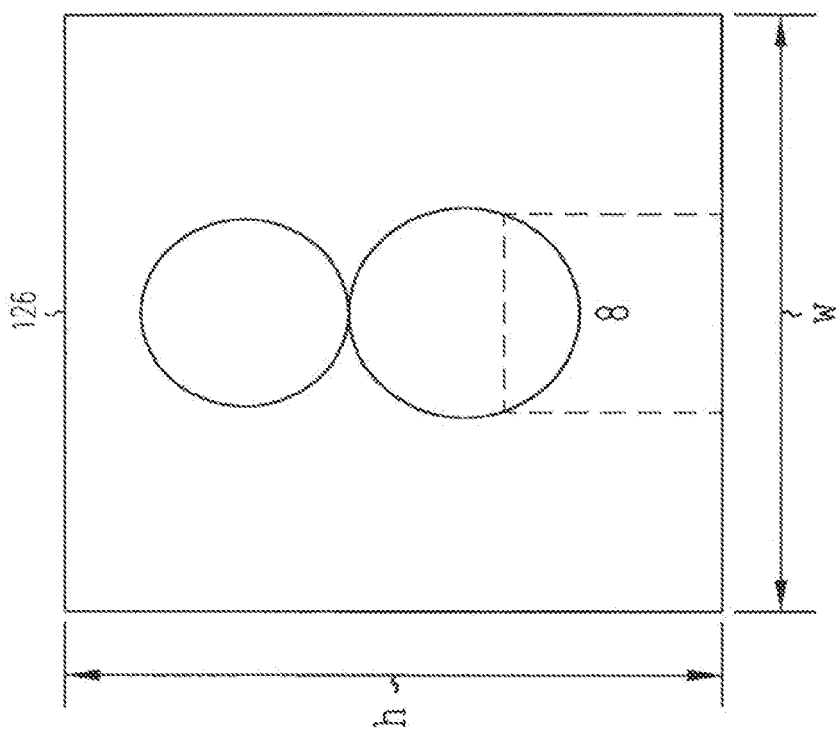
FIG. 6 shows an exemplary tertiary picture that has been cropped from the secondary picture and scaled up for display to a viewer on a display device such as a television screen.

In one exemplary embodiment, the set-top box 38 includes middleware 46 comprising a secondary stream processing module 118 that processes the secondary video stream 104 to selectively extract one of the tertiary video streams 106 that, for example, includes an appropriate advertisement or commercial for display at a remote location serviced by the set-top box 38. The set-top box 38 also includes a reference parameter module 120, which provides reference parameters such as a user profile, a demographic profile, or any other parameters that may influence the selection of an appropriate tertiary video stream 106. The reference parameter module 120 may operate in conjunction with the secondary stream processing module 118 to identify a preferred or appropriate tertiary video stream 106, and thus an appropriate advertisement or commercial, for display on the display device 42. In one exemplary embodiment, the secondary stream processing module 118 includes an extraction module, e.g. a crop module 122 and a scale module 124. The crop module 122 may, in response to the criteria and select commands from the control module 116 and in response to reference parameters provided in the reference parameter module 120, select a tertiary video stream 106 of the plurality of tertiary video streams provided in the secondary video stream 104 and extract the selected or identified tertiary video stream 106 which may then be fed to the scale module 124. It will be appreciated that the crop module 122 crops a portion or subset of the active display area or frame provided by the secondary content stream 104 and displays it on the display device 42. For example, if in response to the criteria and select commands and the reference parameters, the secondary stream processing module 118 identifies subset "8" (see coordinates $X_1Y_1$, $X_2Y_2$, $X_3Y_3$, and $X_4Y_4$ in FIG. 5), the targeted advertisement or commercial provided therein is displayed to an audience or viewers serviced by the set-top box 38. If, however, the extracted subset is not scaled, display of the cropped secondary video stream 104 would form only a segment of the active display area of the display device 42 as shown in broken lines in FIG. 6.

However, the scale module 124 may then scale the subset "8" so that it is displayed on the entire active display area 126 (see FIG. 6) of the display device 42. It will however be appreciated that more than one tertiary video streams 106 (e.g. targeted advertisement or commercial) may be extracted or cropped by the crop module 122 and be displayed simultaneously on the display device 42 in response to the criteria and select commands provided by the control module 116 and the reference parameter module 120. The extraction and display of a particular targeted tertiary video stream 106 tray take place in a completely automated fashion without any human intervention. Accordingly, the middleware 46 may not require any input or action by a viewer and, in certain in embodiments, the middleware 46 may be configured so that the user or viewer has no ability to influence the extraction of the tertiary video stream (targeted advertising and commercials).

Figure 4:
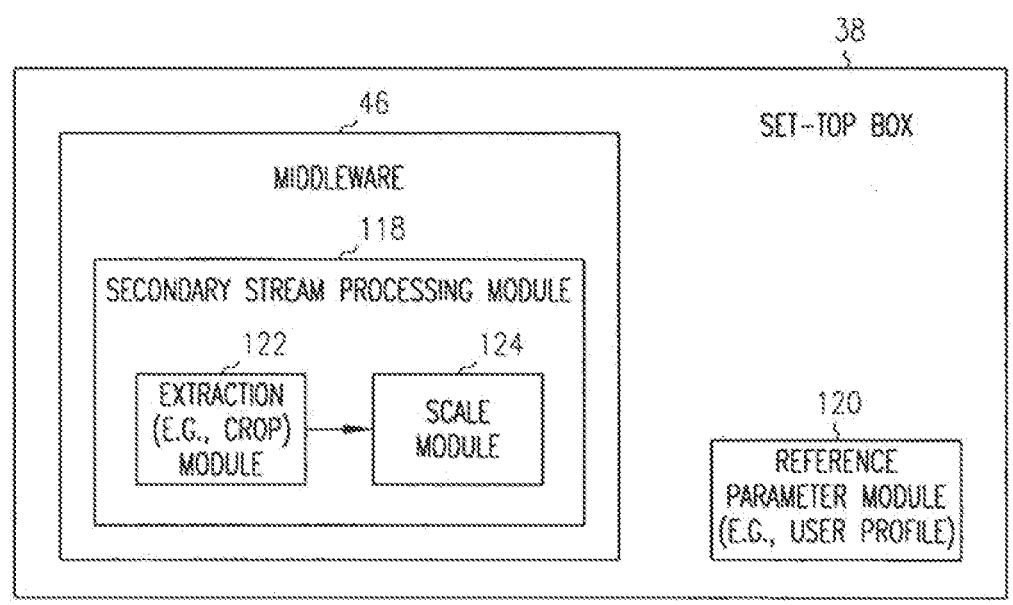
FIG. 4 is a block diagram of exemplary middleware of the set-top box to extract a selected tertiary video stream based on user profile criteria.
Figure 7:
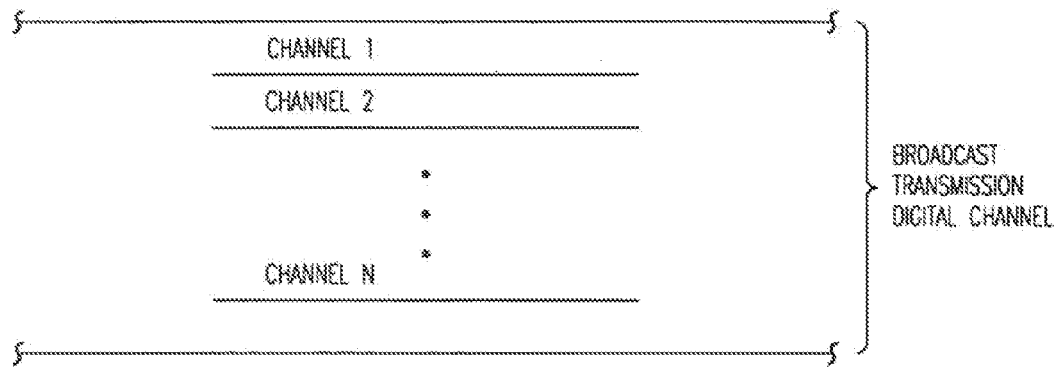
FIG. 7 shows an exemplary digital television feed including a plurality of television channels.
Figure 8:
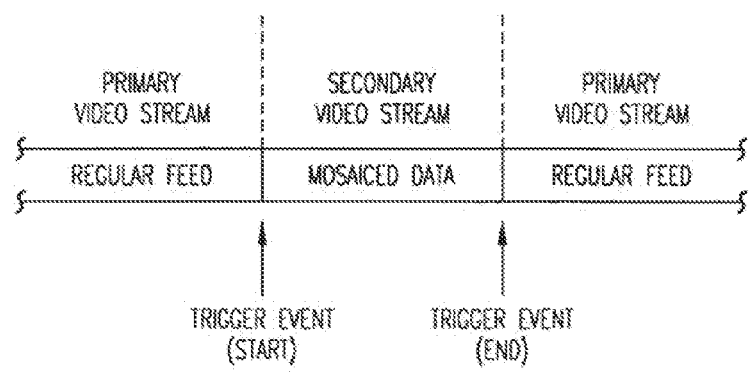
FIG. 8 shows a single channel of the digital television feed or broadcast transmission including a primary video stream and a secondary video stream including mosaiced advertisements or commercials.

FIG. 7 shows an exemplary broadcast transmission including a plurality of digital channels (Channel 1 to Channel M) of the interactive television environment 10. A single channel of the broadcast transmission may be used to communicate the primary video stream 102 and the secondary video stream 104. Accordingly, in this embodiment, a single channel communicates primary context such as a TV program as well as a secondary video stream 104 including a mosaic of targeted advertisements wherein a particular advertisement is extracted and displayed to a user at the set-top box 38 based on reference parameters such as user profiles, demographic profiles or the like and, optionally, control criteria and select commands. FIG. 8 shows an exemplary embodiment of a broadcast transmission including a primary video stream 102 which, upon the occurrence of a trigger event (a begin event), includes a secondary video stream 104 inserted into the broadcast transmission and, upon the occurrence of a further trigger event (an end event) the primary video stream 102 or regular feed may continue to be broadcast to the set-top box 38. In one exemplary embodiment, an advertisement server may provide the plurality of tertiary video streams 106 in high resolution which are then combined or mosaiced into the secondary video stream 104 for a selection by targeting logic provided in the middleware 46. The secondary video stream 104 that is fed to the exemplary encoder 52b (see FIG. 4) may be unencoded digital video such as CCIR 601 or any other serial digital data. It will be appreciated that mosaicing or combining of the plurality of tertiary video streams 106 to form the secondary video stream 104 may be done in real time on-the-fly or, in other embodiments, the secondary video stream 104 including the mosaiced tertiary video streams 106 may be generated and stored for subsequent use in the system 100.

Figure 9:
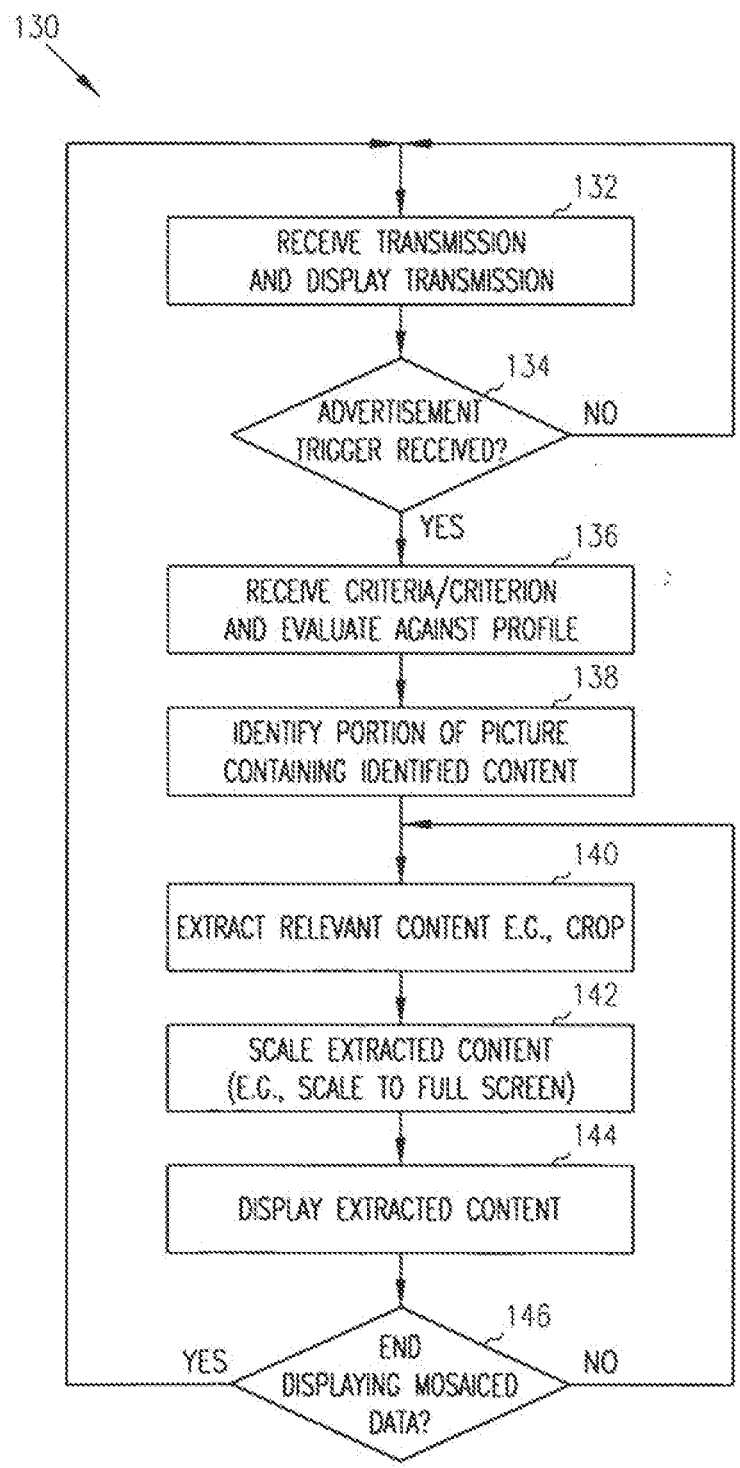
FIG. 9 shows an exemplary flow chart of a method, in accordance with an exemplary embodiment of the invention, for extracting a tertiary content stream from a secondary content stream.

Referring to FIG. 9 of the drawings, reference numeral 130 generally indicates an exemplary method, in accordance with the invention, for extracting a tertiary content stream (e.g., a tertiary video stream) from a secondary content stream (e.g., secondary video stream) comprising a plurality of tertiary content streams (e.g., tertiary video streams). In the method 130, the tertiary video streams are targeted advertisements or commercials which may be of particular relevance to a geographic area serviced by the headend system 18. As shown at operation 132, the set-top box 38 may receive a transmission via a distribution system or network 14 and display the transmission on the display device 42. However, in one exemplary embodiment, upon receipt of a trigger event such as a control packet from the transmission equipment such as the headend system 18, the set-top box (e.g. middleware 46 of the set-top box 38) may identify when the transmission includes a secondary video stream 104 including the mosaic or combination of tertiary video streams 106. If no trigger event is received (see decision operation 134), the method continues to receive the transmission and display the transmission on the display device 42. If, however, an advertisement trigger (e.g. a trigger indicating a second video stream 104 is included in the transmission) is received, the method 130 proceeds to operation 136 where it receives criteria or criterion and evaluates the criterion against a profile provided in the set-top box 38. For example, the criteria or criterion may be provided by the control module 116 (see FIG. 4) which is communicated by the network 30 or included in the transmission using the multiplexer 50. The middleware 46 of the set-top box 37 may then, based on a user profile or any other reference parameters, identify a particular advertisement or commercial for communication to the display device 42. In one embodiment, conventional techniques may be used to identify a particular targeted advertisement and, for example, a score may be generated in response to the reference parameters provided in the reference parameter module 120 and the criterion select commands provided in the control module 116. In other embodiments, the secondary video stream may be identified based on a playlist received from the headend system 18, any real-time event, or any other secondary video stream identification arrangement.

In accordance with the present invention, as shown at operation 138, a subset or portion of the active screen or display area provided by the secondary video stream 104 (see FIG. 5) is identified as containing or providing a relevant targeted advertisement for display via the set-top box 38. The identified portion or subset is then extracted from the active display area (see FIG. 5) using, for example, crop functionality (see operation 140) which may be provided by the middleware 46 of the set-top box 38. As the cropped portion of the active display area is only a portion of the total motion picture or frame provided by the secondary video stream 104, the extracted portion may be scaled (see operation 142) so that it occupies the full active display area 126 (see FIG. 6). It will however be appreciated that the extracted portion or subset may be scaled to occupy any portion up to 100% of the active display area. Thus, in one exemplary embodiment, the extracted portion may use the entire active display area or any part of the active display area (e.g., 50%, 25% etc.) of the active display area.

As shown at operation 144, the extracted content (including a targeted advertisement or commercial) may then be displayed on the display device 42. Thereafter, as shown at operation 146, if an end signal or event advising or indicating termination of transmission of the mosaiced secondary video stream 104 has been received, the method 130 may return to the operation 132 where the regular transmission including, for example, the primary video stream 102 is once again displayed on the display device 42 without any extraction functionality being performed. However, if further mosaiced video data is provided, the method 130 may return to the operation 140.

Figure 10:
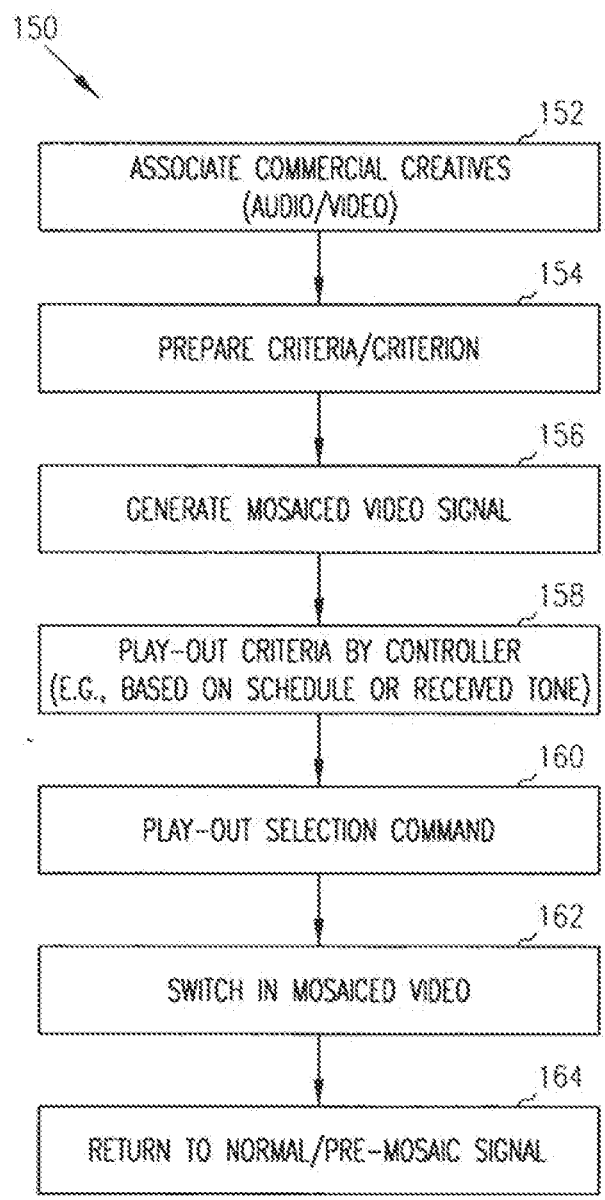
FIG. 10 shows an exemplary flow chart of a method, in accordance with an exemplary embodiment of the invention, for generating a secondary content stream including a plurality of tertiary content streams.

Referring to FIG. 10 of the drawings, reference numeral 150 generally indicates a method, in accordance with the invention, for generating a secondary content stream (e.g., a secondary video stream 104) including a plurality of tertiary content streams (e.g., video content streams 106). In one exemplary embodiment, the tertiary video streams 106 are a plurality of advertisements or commercials that are processed to form a mosaic of video streams provided by the secondary video stream 104. As shown at operation 152, the commercial creatives may be associated (e.g. associating the audio and video of a particular tertiary video stream 106) whereafter, as shown at operation 154, criteria or criterion that may affect the identification of a particular tertiary video stream 106 as being appropriate for display on a particular set-top box 38, is/are determined. Thus, in one exemplary embodiment, although a plurality of tertiary video streams 106 may be provided to the combining module 108, only a selected number of the tertiary video streams 106 may be included in the secondary video stream 104. Thus, in one embodiment, appropriate targeted advertisements may be selected at the headend system 18 for communication to a set-top box 38. The set-top box 38 may then select one of the targeted advertisements provided in the second video stream 104 for display on the display device 42. Accordingly, the selection or identification of targeted advertisements may be determined or influenced at the headend system 18 and/or the set-top box 38.

Returning to the method 150, the combining module 108 (see FIG. 3) may generate a video mosaic signal including a plurality of tertiary video streams 106 (see FIG. 5) included in a single secondary content stream 104 (see operation 156). The timing or play-out of the secondary video stream 104 may be controlled by the control module 116 (see operation 158). In one exemplary embodiment, a start and an end of an advertisement or commercial provided in the primary video stream 102 may be identified based on a schedule or a received tone. Accordingly, the schedule or received tone may define when a secondary video stream 104 replaces advertising content provided in the primary video stream 102. As shown at operation 160, the play-out data may be communicated by a play-out selection command (e.g. using the control module 116) to the set-top box 38. The play-out selection command may be communicated via the network 30 or included within the transmission via the multiplexer 50. Once a play-out selection command has been communicated to the set-top box 38, the secondary video stream 104 may be switched into the transmission (see operation 162). Upon completion of transmission of the secondary video stream 104 (e.g. upon termination of a time period allocated for advertisements or commercials) the transmission may return to a normal non-mosaic signal where the headend system 18 once again communicates the primary video stream, e.g. a television program to the set-top box 38.

Figure 11:
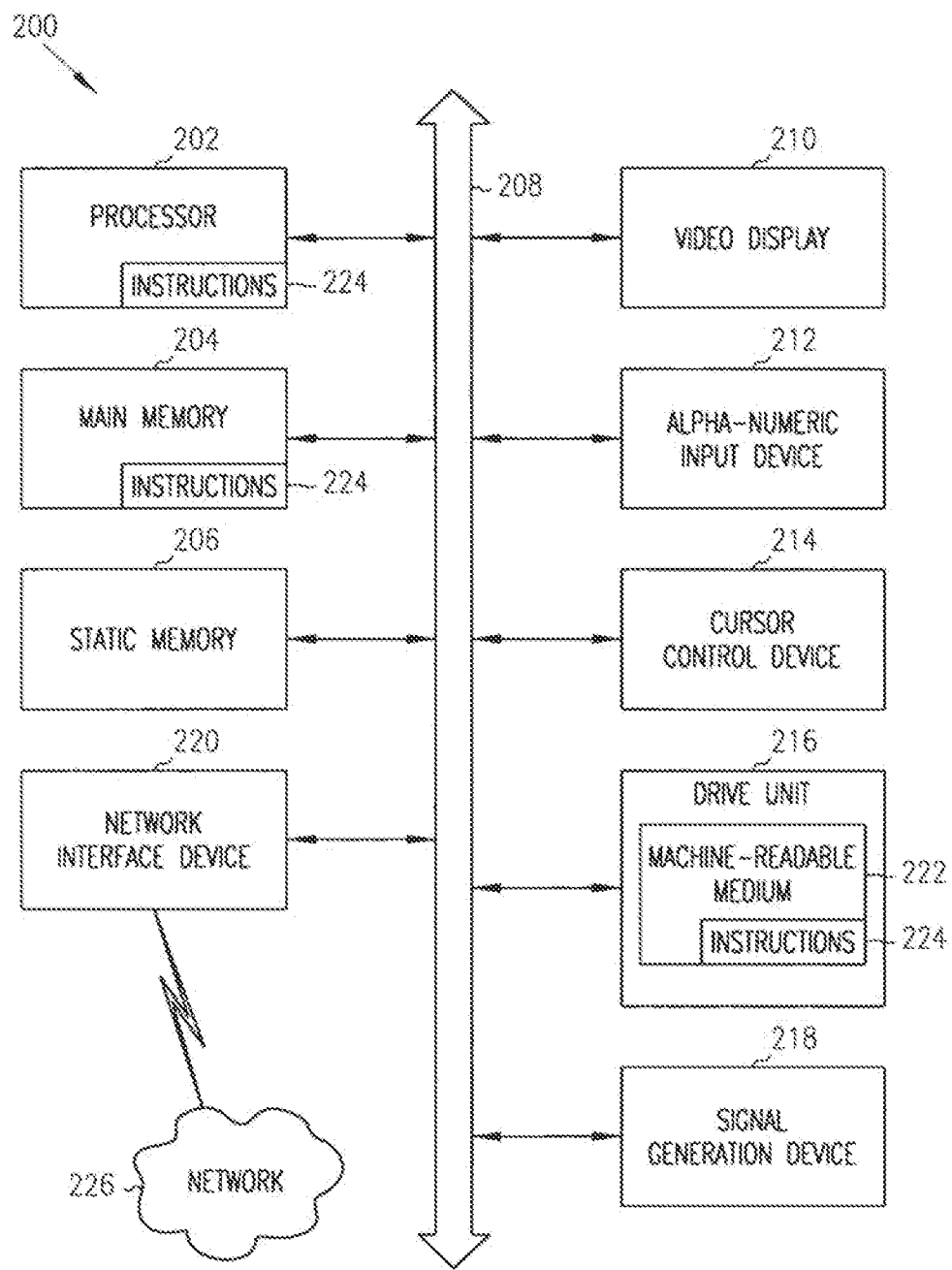
FIG. 11 is a block diagram illustrating a machine, in the exemplary form of a computer system, which may store and execute a set of instructions that cause the machine to perform any of the methods described herein.

FIG. 11 shows an exemplary computer system that may be used to implement any one or more of the systems 87, 64, 100, or storage unit 72, The exemplary computer system 200 includes a processor 202 (e.g., a central processing unit (CPU) a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions (e.g., software 224) embodying any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220.

It will be appreciated to one skilled in the art that one or more of the modules, applications, or the like of the modulator box 70, the set-top box 38 and the storage unit 72 may be combined or integrated.

While the machine-readable medium 292 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals. It will also be appreciate that modules may be implemented in software or hardware.

Thus, a method and system to communicate content to at least one remote unit (e.g., a set-top box) in an exemplary interactive television environment are described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. Further, it will be appreciates that the components/modules described and/or illustrated in the application may represent logical units and do not necessary correspond to one or more physical devices that may be deployed.

The invention claimed is:

1. A method comprising:
providing, by at least one processor, a first media data stream that includes primary media content to a device;
accessing, by the one or more processors, multiple secondary media content;
generating, by the at least one processor, a second media data stream that has a picture area divided into subdivisions, each of the subdivisions of the picture area including different secondary media content among the multiple secondary media content;
providing, by the at least on processor, the second media data stream to the device, the device being configured to:
identify a subdivision among the subdivisions based on a location identifier of the subdivision,
crop the subdivision, and
display only the cropped subdivision scaled to fill a display screen based on the location identifier; and
providing, by the at least on processor, the location identifier of the subdivision to the device, the provided location identifier causing the device to identify the subdivision, crop the subdivision, and display only the cropped subdivision scaled to fill the display screen.

2. The method of claim 1, further comprising:
re-providing the first media data stream to the device in response to expiration of a time duration of the primary media content.

3. The method of claim 1, wherein:
the location identifier of the subdivision is distinct from coordinates of the subdivision; and
the generating of the second media data stream generates a media mosaic in which the subdivisions of the picture area each contain different secondary media content.

4. The method of claim 3, wherein:
the providing of the location identifier of the subdivision of the picture area to the device causes the device to scale the secondary media content contained in the identified subdivision.

5. The method of claim 1, wherein:
the providing of the second media data stream to the device is based on a schedule that identifies a start of the primary media content in the first media data stream.

6. The method of claim 5, further comprising:
re-providing the first media data stream to the device based on the schedule that identifies the start of the primary media content in the first media data stream, the schedule further identifying an end of the primary media content in the first media data stream.

7. The method of claim 1, wherein:
the providing of the second media data stream to the device is based on a start tone that identifies a start of the primary media content in the first media data stream.

8. The method of claim 7, further comprising:
re-providing the first media data stream to the device based on an end tone that identifies an end of the primary media content in the first media data stream.

9. A system comprising:
at least one processor; and
a memory storing instructions that, when executed by the at least one processor, cause the at least one processor to perform operations comprising:
providing a first media data stream that includes primary media content to a device;
accessing multiple secondary media content;
generating a second media data stream that has a picture area divided into subdivisions, each of the subdivisions of the picture area including different secondary media content among the multiple secondary media content;
providing the second media data stream to the device, the device being configured to:
identify a subdivision among the subdivisions based on a location identifier of the subdivision,
crop the identified subdivision, and
display only the cropped subdivision scaled to fill a display screen based on the location identifier; and
providing the location identifier of the subdivision to the device, the provided location identifier causing the device to identify the subdivision, crop the subdivision, and display only the cropped subdivision scaled to fill the display screen.

10. A non-transitory machine-readable storage medium comprising instructions that, when executed by at least one processor of a machine, cause the machine to perform operations comprising:
providing a first media data stream that includes primary media content to a device;
accessing multiple secondary media content;
generating a second media data stream that has a picture area divided into subdivisions, each of the subdivisions of the picture area including different secondary media content among the multiple secondary media content;
providing the second media data stream to the device, the device being configured to:
identify a subdivision among the subdivisions based a location identifier of the subdivision,
crop the subdivision and
display only the cropped subdivision scaled to fill a display screen based on the location identifier; and
providing the location identifier of the subdivision to the device, the provided location identifier causing the device to identify the subdivision, crop the subdivision, and display only the cropped subdivision scaled to fill the display screen.

11. A method comprising:
receiving, by at least one processor, a first media data stream that includes primary media content from a server machine;

receiving, by the at least one processor, a second media data stream from the server machine, the server machine having accessed multiple secondary media content and generated the second media data stream based on the multiple secondary media content, the second media data stream having a picture area divided into subdivisions, each of the subdivisions of the picture area including different secondary media content among the multiple secondary media content;
accessing, by the at least one processor a location identifier of the subdivision among the subdivisions of the picture area of the second media data stream, the location identifier being usable to identify the subdivision;
using, by the at least one processor, the location identifier to identify the subdivision among the subdivisions of the picture area;
cropping, by the at least one processor, the identified subdivision of the picture area; and
displaying, by the at least one processor, only the cropped subdivision scaled to fill a display screen based on the accessing of the location identifier of the subdivision.

12. The method of claim 11, further comprising:
re-receiving the first media data stream in response to expiration of a time duration of the primary media content.

13. The method of claim 11, wherein:
the location identifier of the subdivision is distinct from coordinates of the subdivision; and
the receiving of the second media data stream receives a media mosaic in which the subdivisions of the picture area each contain different secondary media content.

14. The method of claim 13, further comprising:
scaling the secondary media content contained in the identified subdivision; and wherein
the accessing of the location identifier of the subdivision of the picture area is from a server machine and causes the scaling of the secondary media content contained in the identified subdivision.

15. The method of claim 11, wherein:
the receiving of the second media data stream is based on a schedule that identifies a start of the primary media content in the first media data stream.

16. The method of claim 15, further comprising:
re-receiving the first media data stream based on the schedule that identifies the start of the primary media content in the first media data stream, the schedule further identifying an end of the primary media content in the first media data stream.

17. The method of claim 11, wherein:
the receiving of the second media data stream is based on a start tone that identifies a start of the primary media content in the first media data stream.

18. The method of claim 17, further comprising:
re-receiving the first media data stream based on an end tone that identifies an end of the primary media content in the first media data stream.

19. A system comprising:
at least one processor; and
a memory storing instructions that, when executed by the one or more processors, cause the at least one processor to perform operations comprising:
receiving a first media data stream that includes primary media content from a server machine;
receiving a second media data stream from the server machine, the server machine having accessed multiple secondary media content and generated the second media data stream based on the multiple secondary content, the second media data stream having a picture area divided into subdivisions, each of the subdivisions of the picture area including different secondary media content among the multiple secondary media content;

accessing a location identifier of the subdivision among the subdivisions of the picture area of the second media data stream, the location identifier being usable to identify the subdivision;

using the location identifier to identify the subdivision among the subdivisions of the picture area;

cropping the identified subdivision of the picture area; and displaying only the cropped subdivision scaled to fill a display screen based on the accessing of the location identifier of the subdivision.

20. A non-transitory machine-readable storage medium comprising instructions that, when executed by at least one processor of a machine, cause the machine to perform operations comprising:

receiving a first media data stream that includes primary media content from a server machine;

receiving a second media data stream from the server machine, the server machine having accessed multiple secondary media content and generated the second media data stream based on the multiple secondary media content, the second media data stream having a picture area divided into subdivisions, each of the subdivisions of the picture area including different secondary media content among the multiple secondary media content;

accessing a location identifier of the subdivision among the subdivisions of the picture area of the second media data stream, the location identifier being usable to identify the subdivision;

using the location identifier to identify the subdivision among the subdivisions of the picture area;

cropping the identified subdivision of the picture area; and displaying only the cropped subdivision scaled to fill a display screen based on the accessing of the location identifier of the subdivision.

* * * * *

UNITED STATES PATENT AND TRADEMARK OFFICE
CERTIFICATE OF CORRECTION

PATENT NO. : 9,591,343 B2  
APPLICATION NO. : 14/872950  
DATED : March 7, 2017  
INVENTOR(S) : Joel Zdepski Page 1 of 1

It is certified that error appears in the above-identified patent and that said Letters Patent is hereby corrected as shown below:

In Column 14, Line 35, in Claim 1, delete "on" and insert --one-- therefor

In Column 14, Line 43, in Claim 1, delete "on" and insert --one-- therefor

In Column 15, Line 33, in Claim 9, after "the", delete "identified"

In Column 15, Line 41, in Claim 10, delete "Anon-transitory" and insert --A non-transitory-- therefor In Column 15, Line 56, in Claim 10, delete "subdivision" and insert --subdivision,-- therefor In Column 16, Line 10, in Claim 11, delete "processor" and insert --processor,-- therefor In Column 17, Line 1, in Claim 19, after "secondary", insert --video--

In Column 17, Line 12, in Claim 19, after "area; and", insert --¶--

In Column 18, Line 5, in Claim 20, delete "haying" and insert --having-- therefor Signed and Sealed this  
Third Day of April, 2018

Andrei Iancu  
*Director of the United States Patent and Trademark Office*